US006634060B1

(12) United States Patent
Lagler et al.

(10) Patent No.: US 6,634,060 B1
(45) Date of Patent: Oct. 21, 2003

(54) COORDINATED MULTI-AXIS HINGE AND CLOSURE USING THE SAME

(75) Inventors: Louis Lagler, Zurich (CH); Rudolf Rentsch, Meilen (CH)

(73) Assignee: Creanova, AG., Baar (CH)

( * ) Notice: Subject to any disclaimer, the term of this patent is extended or adjusted under 35 U.S.C. 154(b) by 0 days.

(21) Appl. No.: 09/446,533

(22) PCT Filed: Jan. 27, 1999

(86) PCT No.: PCT/IB99/00277

§ 371 (c)(1),
(2), (4) Date: Mar. 24, 2000

(87) PCT Pub. No.: WO99/57029

PCT Pub. Date: Nov. 11, 1999

(30) Foreign Application Priority Data

Apr. 30, 1998 (CH) ............................................... 981/98

(51) Int. Cl.[7] ........................... B65D 43/16; F16C 11/12
(52) U.S. Cl. ..................... 16/225; 16/DIG. 13; 220/837
(58) Field of Search ................................ 215/235, 237; 220/4.24, 839, 838, 4.22, 4.23, 837; 16/225, DIG. 13; 222/498, 556

(56) References Cited

U.S. PATENT DOCUMENTS 4,403,712 A 9/1983 Wiesinger
4,503,991 A * 3/1985 Joyce .......................... 16/225
4,638,916 A 1/1987 Beck et al.
5,148,912 A 9/1992 Nozawa
5,271,536 A * 12/1993 Wilson ....................... 222/498
5,437,383 A * 8/1995 Stull .......................... 215/235
5,547,091 A * 8/1996 Neveras et al. ............. 215/237
5,558,239 A * 9/1996 Dubach ....................... 215/235
5,642,824 A * 7/1997 Hess, III et al. ............ 215/235
5,794,308 A * 8/1998 Rentsch et al. ............... 16/225
6,041,477 A * 3/2000 Rentsch et al. ............... 16/225
6,050,434 A * 4/2000 McNab ....................... 215/235
6,152,320 A * 11/2000 Hierzer et al. .............. 220/838

FOREIGN PATENT DOCUMENTS

DE A4335107 4/1995
EP A0778218 6/1997

OTHER PUBLICATIONS

Analysis and Design of Flight Vehicles, E.F. Bruhn, Feb. 2003.
Budget bellows offer best of both coupling worlds, Feb. 2003.
Rexnord Antriebstechnik, Feb. 2003.
Products, Coupling, Feb. 2003.
Couplings, Feb. 2003.
Google Search for "Torsionally stiff", Feb. 2003.
Torque Measurement, Feb. 2003.
TMF Torque Transducer, Feb. 2003.
Coupling for complex tasks, Feb. 2003.
How to Board Info sector (Snowboards vary widely in terms of quality and construction), Feb. 2003.
Ski Tips, Feb. 2003.
Backcountry skiing, Feb. 2003.

* cited by examiner

*Primary Examiner*—Anthony Knight
*Assistant Examiner*—Doug Hutton
(74) *Attorney, Agent, or Firm*—Robert E. Bushnell, Esq.

(57) ABSTRACT

A coordinated multi axis hinge arrangement provides a snap action between stable open and closed states. When the hinges operate between the stable open and closed states across a dead center position, resilient forces imparted by torsionally rigid connecting elements of the hinge to adjacent hinge parts such as body and lid elements are transferred by coupling or transmitting areas adjacent the bending regions or film hinges to remote resilient distortion or deformation energy storage areas. As the hinge passes a dead center position, this energy is in turn supplied and returned to the rigid connecting elements to impart snap action to the closure. The closure may be cast as a single piece of plastic material and may be cast in the open position.

29 Claims, 7 Drawing Sheets

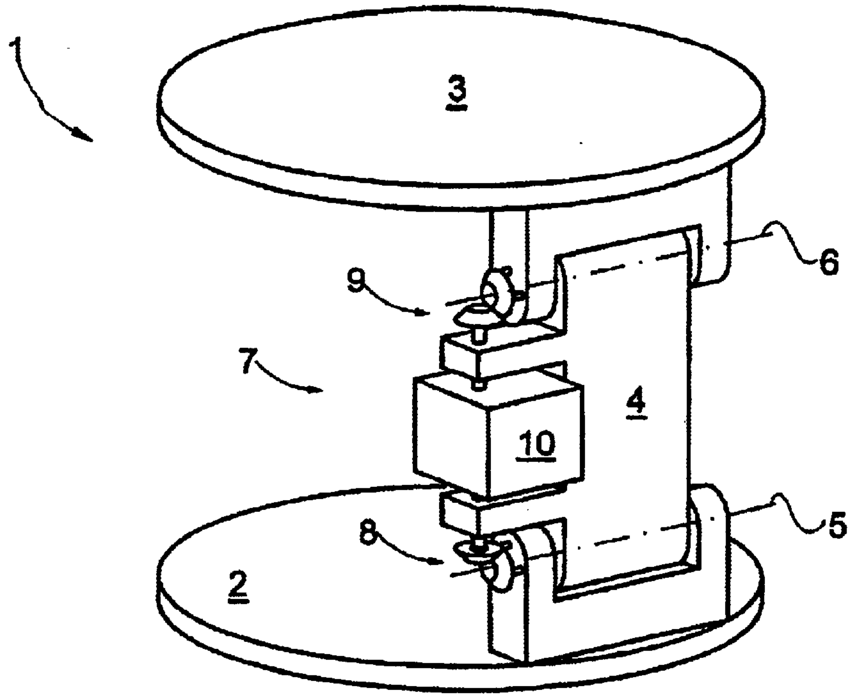
Fig. 1 (Background Art)
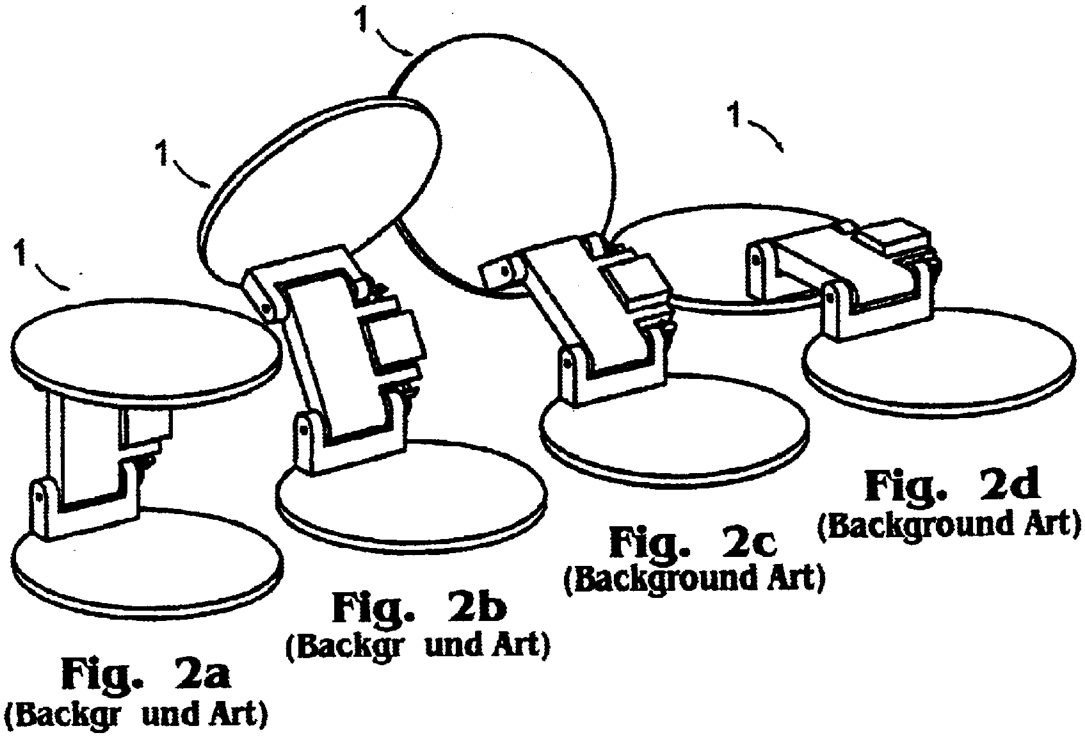
Fig. 2d
(Background Art)
Fig. 2c
(Background Art)
Fig. 2b
(Backgr und Art)
Fig. 2a
(Backgr und Art)

COORDINATED MULTI-AXIS HINGE AND CLOSURE USING THE SAME

This application is the national phase under 35 U.S.C. §371 of PCT International Application No. PCT/IB99/00277 which has an International filing date of Jan. 27, 1999, which designated the United States of America.

FIELD OF THE INVENTION

The present application is generally directed to a snap hinge, particularly to a hinge usable in injection molded one-piece plastic closures.

BACKGROUND OF THE INVENTION

The dispensing of consumable materials such as cosmetics and food stuffs creates a demand for dispensing closures which can be manufactured economically and which fully seal the container when in the closed position. Because such closures are often utilized in disposable containers for consumer goods, the cost of such closures is of substantial concern, as is the desire for closures which have excellent consumer convenience and a good tactile feel.

In the past, a first class of closures employing a single main hinge connection or a plurality of main hinges aligned along a single axis were often used. Some of these hinges employ an intermediate element such as a spring element or a taut band in order to produce a dead center position where tension within the closure will prevent the closure from stably resting in its position, driving the closure either more fully open, or more fully closed. Such an unstable equilibrium position is generally thought desirable in closures of this type as it provides the consumer with a closure with a generally good tactile feel. However, such single main hinge type closures, even provided with such an intermediate element, require significant offset of the main hinge from the closure contour due to the simple movement of the cap as illustrated in FIG. 3 of the present application. These hinges are also difficult to mold due to asymmetrical flow paths during molding. This therefore places the hinge well outside the closure body, considered undesirable in such closures. Such single main hinge type closures are also often difficult to mold. An example of such devices employing a single main hinge include those disclosed by U.S. Pat. No. 4,403,712 to Weisinger and U.S. Pat. No. 4,638,916 to Beck et al.

A second class of hinges employs a multiple joint axis hinge arrangement. However, the opening and closing of the multiple joints is uncoordinated in this class of hinges. An example of such an uncoordinated hinge is U.S. Pat. No. 5,148,912 to Nozawa where two hinge parts are connected to each other via two resilient belts which are flexible or elastic over their entire length. In such a closure, the resilient belt plates connecting the hinged lid to the body bend or flex over their entire length in order to produce a force driving the hinge into a single stable position, the hinge otherwise being continually stressed. A lack of coordination between the multiple axis of the hinge allows the lid to move in multiple paths with respect to the closure, there being no coordination between the closure parts.

A third class of hinges are coordinated multi-axis hinge arrangements which generally pivot about two hinge axes and are designed with two, typically tensionless, stable positions, namely a dead center or unstable equilibrium position being provided therebetween. In such a hinge, an over centering force tends to drive the hinge to one of two stable positions from the dead center position. Such hinges are believed to be the invention of an inventor of the present application and are best described in U.S. Pat. No. 5,794,308 entitled "Hinge". Although at the time the '308 invention was invented, the model of FIG. 1 of the present invention was not known, the invention of the '308 patent can generally be described with reference to this model. Such hinges employ a pair of hinge elements including a flexurally rigid intermediate hinge part 4 coupled to the first and second hinge parts, typically the body and lid of a closure via coupling elements 6, 7 which provide elastic relieving movement in the region of a dead center position.

In other words, in the '308 patent, coupling elements which are connected directly to the substantially flexurally rigid intermediate hinge part, absorb elastic deformation to produce the snap action forces in the region of the dead center position. While the teachings of the '308 patent provide an excellent closure, since the time of the invention of this patent, the inventors of the present application have discovered various ways to vary and enhance the performance of hinges of the type discussed in the '308 patent.

SUMMARY OF THE INVENTION

It is accordingly an object of the present invention to improve upon the design of the aforementioned hinges by, at least in part, transferring the forces of distortion or deformation created by the flexurally or torsionally rigid intermediate parts or connecting arms to one or more resilient areas facilitating storage of this energy remotely from the coupling elements or areas to which the flexurally rigid connecting arms are connected.

It is a further object of the present application to increase the capacity of a closure to absorb resilient energy from torsionally stiff connecting arms, by transferring some or all of that energy to areas not directly adjacent from the bending areas to which the connecting arms are connected, thereby improving the resilient snap-action force obtained from a particular closure geometry, particularly in closures of relatively small size.

According to the concepts of the present application, the first and second hinge parts are connected by at least two connecting arms separated from each other and connected to the hinge parts by bending regions. The connecting arms are substantially torsionally stiff and the connecting arms, when the closure is moved from one stable state to the other, impart resilient forces to one or both of the first and second hinge parts. These forces are then transferred by coupling or transmitting areas to one or more resilient storage areas which store the deformation forces as spring energy due to bending. Although these coupling or transmitting areas may be themselves resilient and store energy as contemplated by the '308 patent, the inventive embodiments of the present application transfer some or all of this energy to resilient areas remote from the bending areas.

According to further teachings of the present application, the offset of the hinge from the parting line between the body and lid of the closure may be varied in order to accomplish desired effects such as, in one embodiment, providing a latching mechanism, and in another embodiment, avoiding interference between the lid and body during closure, even in the presence of protrusions from the closure body or unusual shapes designed into the closure lid.

According to further teachings of the present application, the molds used to produce such a coordinated multi-axis hinge arrangement may be designed to compensate for mold shrinkage in the body, lid and connecting arms and still produce desired geometries. Optimal thin film hinges operate as efficient bending areas for the hinge.

The accomplishment of the objectives of the present application will become more fully apparent from the detailed description given hereafter from which the spirit and scope of the invention will become apparent to those skilled in the art. It should be understood, however, that the specific examples and description presented herein below are merely exemplary of the present invention which is described solely by the appended claims.

BRIEF DESCRIPTION OF THE DRAWINGS

The present invention will be more fully understood from the detailed description given herein below and the accompanying drawings which should not be considered limiting to the invention described in the appended claims.

FIG. 1 illustrates a mechanical model of a coordinated multi-axis hinge arrangement that is of the class employed in the embodiments of the present application;

FIG. 2 illustrates specific coordinated movement of the multi-axis hinge arrangement of FIG. 1;

DETAILED DESCRIPTION OF THE PREFERRED EMBODIMENTS

Figure 3:
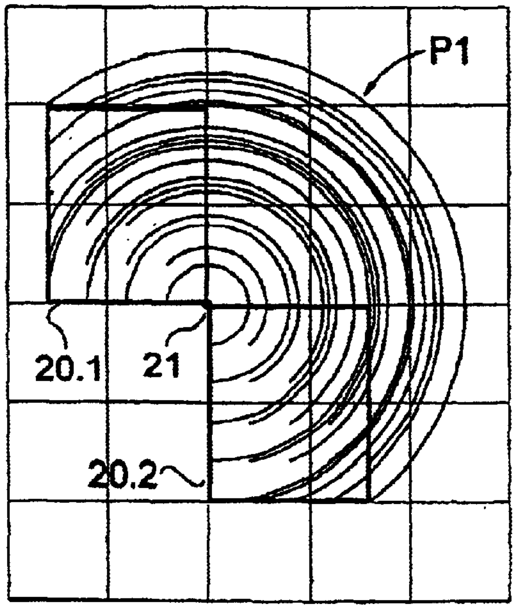
Fig. 3 (Background Art)
FIG. 3 is a family of cinematic curves showing typical paths of a plurality of points in space rotating around a main hinge connection of the type well known in the prior art.

A better understanding of the present invention may be achieved through an examination of the present detailed description which, when examined in connection with the accompanying drawings, sets forth preferred embodiments of the present invention. It should be understood that like elements in the various figures are generally identified with like reference numbers.

During the course of development of various coordinated multi-access hinge arrangements, the inventors have discovered that such a hinge may be described with reference to the mechanical model 1 of the coordinated multi-axis hinge arrangement illustrated in FIG. 1 of the present application. The mechanical model 1 of the multi-axis hinge arrangement has been discovered by the inventors as a way to describe the operation of the coordinated multi-axis hinge arrangement in its most general or basic form. The mechanical model 1 of a coordinated multi-axis hinge arrangement includes a lower or first hinge part 2, an upper or second hinge part 3, and at least one connecting arm 4 connecting the lower or first hinge part 2 and upper or second hinge part 3 via first and second rotational axes 5, 6. Note that while in the embodiment of FIG. 1, these axes are illustrated as parallel, it is possible to skew these axes with respect to each other in either of two dimensions.

A coordinating device 7 provides the coordination for the multi-axis hinge arrangement. In the mechanical model of FIG. 1, the coordinating device 7 is represented by two pairs of mating bevel wheels 8, 9 and a transmission or gearbox 10 which may have any suitable coupling ratio, allowing the rate of pivot of the hinge about the first and second rotational axes 5 and 6, to differ in accordance with the transmission ratio selected for the gear box 10. Alternatively, as may be desired to achieve special effects, the transmission ratio of the gearbox 10 may be made non-linear. However, it is within the contemplation of the present invention that some defined coordination exists between the pivoting of the lower and upper hinge parts 2, 3, to the connecting arm 4.

FIG. 2 illustrates how movement between the lower hinge part 2, connecting arm 4, and upper hinge part 3 is coordinated according to a coordinated multi-axis hinge arrangement of the type disclosed in the present application. In the example of FIG. 2, the gearbox 10 of the coordinating device 7 exhibits a 1 to 1 ratio. FIG. 2*a*) shows the multi-axis hinge arrangement 1 in a closed position. FIG. 2*d*) shows the multi-axis hinge arrangement fully open with the upper and lower hinge parts 180° with respect to each other. FIGS. 2*b*) and 2*c*) show the multi-axis hinge arrangement 1 in intermediate positions. These figures collectively illustrate how the coordinating device 7 ensures that the relative movement between the lower hinge part 2 and the connecting arm 4, on the one hand, and the upper hinge part 3 and connecting arm 4, on the other hand, are always coordinated relative to each other.

While the gearbox 10 is illustrated with a transmission ratio of 1 to 1 in this illustration, resulting in symmetrical rotation of the upper hinge part 3 about the rotation axis 6 as compared to the lower hinge part 2 about the rotation axis 5, a different transmission ratio may be selected for the gear box to vary the rate of angular change provided at pivots 5, 6.

In contrast with the coordinated movement of a coordinated multi-axis hinge arrangement as illustrated in FIGS. 1 and 2, uncoordinated multi-axis hinge arrangements are unstable because at least one degree of freedom remains undefined. If the coordination device 7 is removed from a multi-axis hinge, relative movement of the 15 two hinge parts 2, 3 with respect to the connecting arm 4 cannot be determined. The upper hinge part 3 may completely open with respect to the connecting arm 4 before the lower hinge part 2 begins to open with respect to the connecting part 4. Thus, a particular position in space may be reached by multiple movement paths in such an uncoordinated device.

FIG. 3 illustrates the path of a rectangle traveling through space under constraint of a single hinge connection 21. This so-called cinematic representation illustrates the movement of various points of the rectangle 20 as it rotates through space about the main hinge connection 21 along path P1. This is representative of a first class of hinges where a single hinge pivot is utilized. The main hinge connection 21 is, in the FIG. 3 example, perpendicular to the plane of the figure. Thus, the rectangle 20 moves from a first position 20.1 to a second position 20.2. The paths P1 of all points of the rectangle 20 are circular in this example where the two rectangles 20.1 and 20.2 are connected directly by the main hinge connection 21.

In the case of closures, it is desirable to remove a lid as represented by the rectangle 20 to an open position well away from the closure body. In such a single hinge arrangement, the main hinge connection 21 must be spaced well away from the container to accomplish this objective. This produces a substantial protrusion from the closure body, an aspect of such single hinge closures considered undesirable.

Figure 4A:
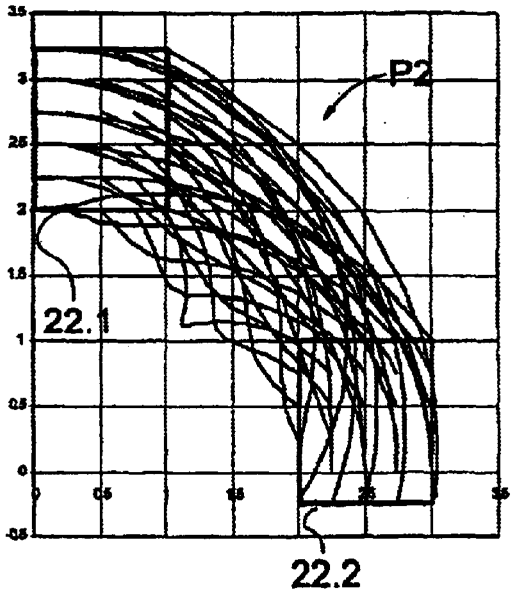
Fig. 4a (Background Art)
FIGS. 4*a*) to 4*c*) each show a family of cinematic curves of various coordinated multi-axis hinge arrangements of the type illustrated in FIGS. 1 and 2.

A completely different concept of the coordinated multi-axis hinge arrangement is apparent from an examination of FIGS. 4*a*) to 4*c*). A review of cinematic representations of these figures, as compared to the cinematic representation of a single hinge as illustrated in FIG. 3, clearly illustrates the functional advantages of a coordinated multi-axis hinge.

FIG. 4*a*) shows a first typical path pattern P2 of points within the rectangle 22 as it pivots 180° around a coordinated multi-axis hinge arrangement 1 as illustrated in FIG. 1, for example. It is apparent that, because there is no main hinge, the rectangle 22 in the closed position 22.1 is displaced a significant distance by the coordinated multi-axis hinge arrangement 1 into the open position 22.2. Both of these positions 22.1 and 22.2 may be considered stable positions where no substantial resilient stress is stored in the hinge parts 2, 3. The path pattern P2 is clearly not circular. Thus, it is apparent from this example that a coordinated multi-axis hinge arrangement may be designed to prevent one element from interfering with specific other elements.

Figure 4B:
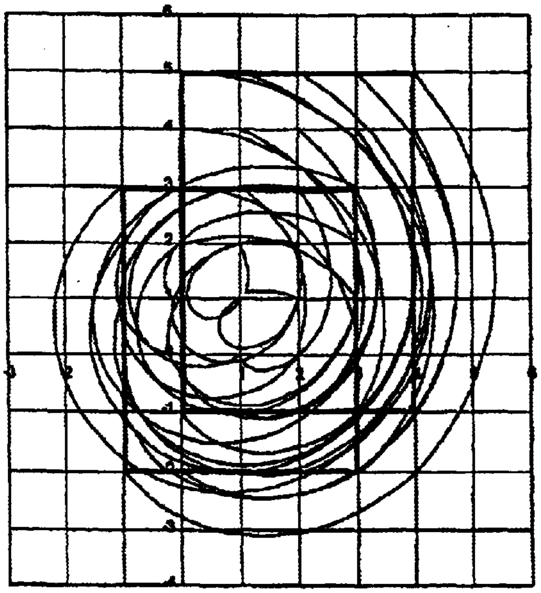
Fig. 4b (Background Art)
Figure 4C:
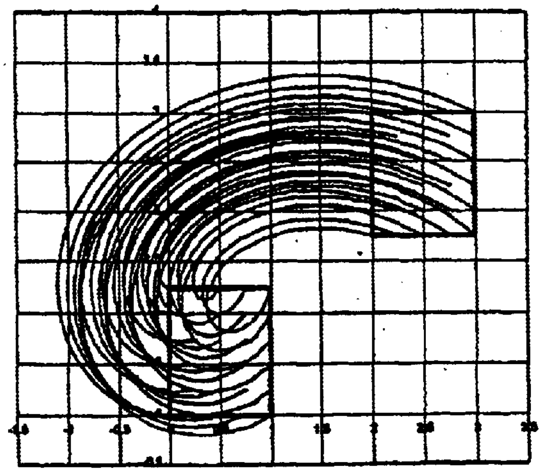
Fig. 4c (Background Art)

By modifying the distance of the rotation axes 5, 6 in space and the transmission ratio of the coordinating device 7, substantial effect can be achieved on the path pattern and nearly any desired path can be realized. Examples of two further possible path patterns are illustrated in the cinematic diagrams of FIGS. 4*b*) and 4*c*). It is very important to understand that substantial contact between the upper and lower hinge parts or, in a practical example, a closure which employs a hinge such as illustrated in FIG. 1, must generally be avoided to achieve the desired motion. (Compare, however FIGS. 10*a* and 11 which make use of intentional interference to produce a latching action.) It is apparent from FIGS. 4*b* and 4*c* that, as compared to a single main hinge connection as illustrated by the cinematic of FIG. 3, many different requirements may be fulfilled by adjusting the parameters of a coordinated multi-axis hinge arrangement as taught herein.

Figure 5:
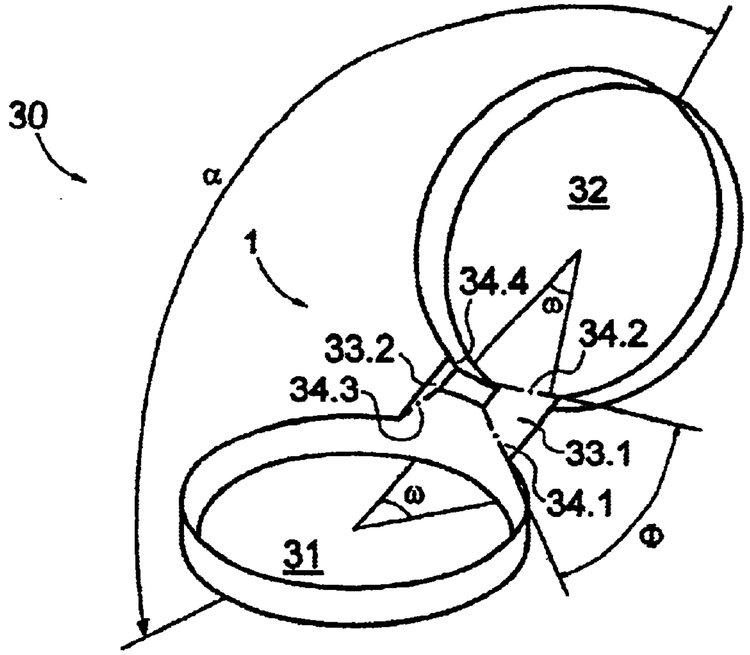
FIG. 5 schematically illustrates an embodiment of a multi-axis hinge arrangement in a closure according to one embodiment of the present application.

FIG. 5 shows schematically an embodiment of a coordinated multi-axis hinge arrangement 1 in a closure 30. As with other embodiments described in the present application, the movement and coordination of the multi-axis hinge arrangement is similar to that described above in the mechanical model of FIG. 1.

The closure 30 is drawn in a half open position and is useful in defining a number of the terms utilized in the present application. The closure comprises a body 31, which corresponds to the lower hinge part 2 of FIG. 1, a lid 32, which corresponds to the upper hinge part 3 of FIG. 1, and two connecting arms 33.1,33.2 which correspond to the substantially flexurally rigid intermediate parts 4 of the embodiments of the aforementioned U.S. Pat. No. 5,794,308 and the connecting elements 5 of our copending International Application No. PCT/EP96/02780.

Each connecting arm 33.1, 33.2 of FIG. 5 is connected to a coupling portion of the body 31 and the lid 32 of the closure 30 by bending regions 34.1–34.4 which maybe, in a preferred embodiment, film hinges. The bending regions 34.1–34.4 are arranged in this embodiment such that each connecting arm 33.1, 33.2 is trapezoidally shaped. Although the bending regions are shown symmetrically in FIG. 5, an asymmetric arrangement of the bending regions 34.1–34.4 is also possible within the contemplation of the present invention, and would result in the same effect as changing the transmission ratio of the coordinating device 7 of the mechanical model of FIG. 1. The coordination between the hinge parts 31. 32, is achieved by the physical arrangement of the bending regions 34.1–34.4 in space and the design of the connecting elements 33.1, 33.2. In this style of hinge, two types of coordination are obtained. The first type of coordination is the coordination between the multiple hinge axes such as already described. A second type of "coordination" is the lateral and torsional stability of the hinge which increases as the hinge travels over its intended path from open to closed. This is particularly important since this second form of stability allows mechanized closing of the closure. Absent this lateral and torsional stability, the hinge would not self center on the closed position and the closure could not be used in automated filing and packaging machinery. Further details of this relationship will be explained hereinafter.

The arrangement illustrated in FIG. 5 requires a predetermined amount of flexure or resiliency of one or more of the components of the closure 30 of FIG. 5. Such resiliency can be accomplished in accordance with the teachings of U.S. Pat. No. 5,794,308 as will be described further hereinafter, may be accomplished according to the teachings of our pending application PCT/EP96/02780, or may be accomplished according to further teachings set forth in the present application. To make use of such 25 resiliency, and accomplish energy storage through this structural deformation, the bending regions 34.1–34.4 are arranged in space in a desired fashion. As such design aspects are described in further detail in the aforementioned prior patent and pending application, which are incorporated herein by reference, further explanation of these aspects of the invention are not presented here.

When the closure 30 is opened or closed, the geometry of the connecting elements 33.1, 33.2 causes specific deformation of the structure of the hinge area. The degree and extent of deformation of various aspects of the closure geometry is dependent on the angles $\omega$ and $\phi$, and an opening angle $\alpha$ of the closure. In one preferred embodiment of the present application, the structural deformation is designed to be zero at times when the closure 30 is in a stable position, in the exemplary embodiment, the fully opened and fully closed position, with $\alpha$ being zero in the fully closed position and $\alpha$ having the designed maximum angular value in the fully opened position. However, structural deformation and its corresponding accumulation of force can be designed into a closure in any position, for example the fully closed position.

If the closure is designed so that a opening force is residually maintained when the closure is in the fully closed position, a greater snap action effect upon opening may be desirably obtained. Alternatively, a residual closing force may be desirable when the closure is in the fully closed position so as to better maintain the closed state.

Figure 6:
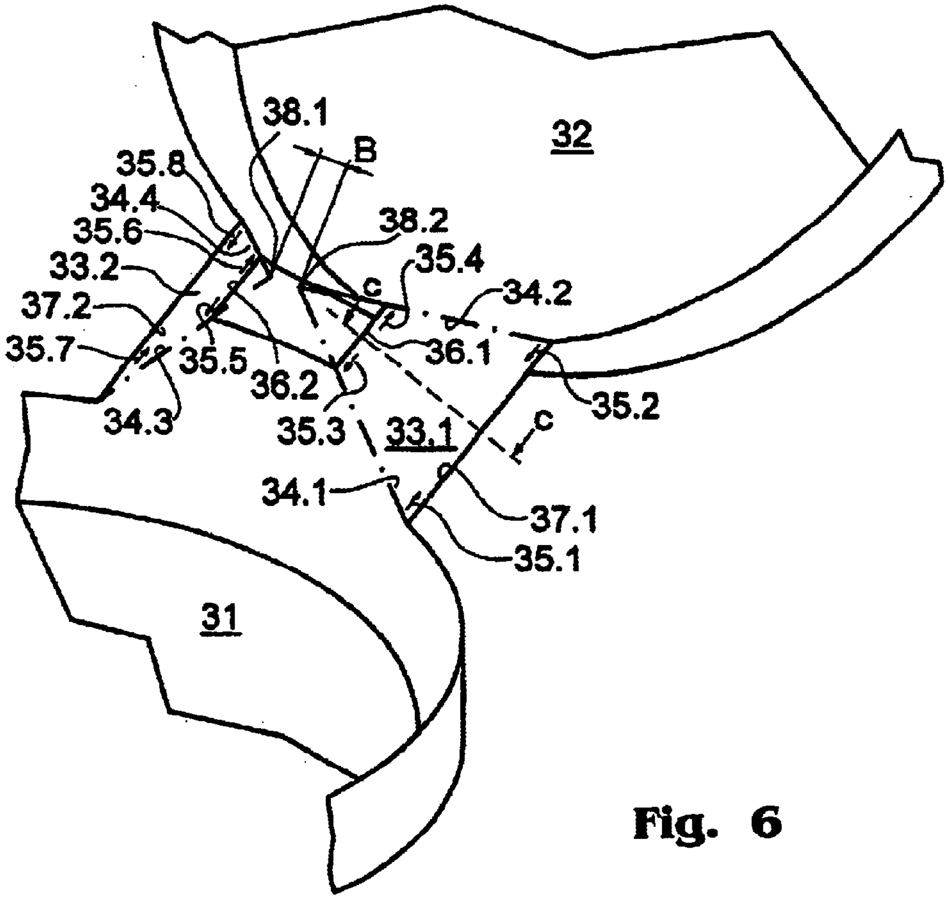
FIG. 6 is a close up view of a portion of the schematic embodiment of FIG. 5.

FIG. 6 is a partial close-up view of the embodiment of FIG. 5.

In addition to the detail of FIG. 5, as explained further in the above-mentioned PCT/EP96/02780 application, FIG. 6 better illustrates the forces which, upon actuation of the closure of FIG. 6, produce structural deformation in some portion of the closure.

The connecting elements 33.1, 33.2 are desirably trapezoidally shaped as a truncated base of a triangle. The shorter edges of 36.1, 36.2 which serves to truncate the triangles, producing the trapezoidal connecting elements 33.1, 33.2, are subject to compression forces when, resisting these compression forces to produce deformation forces for application to another portion of the closure structure as illustrated in 35.3, 35.4, 35.5, and 35.6. Similarly, the longer edges 37.1, 37.2 of each connecting element are subjected to tension during the hinge closure process and produce deformation forces 35.1, 35.2, 35.8, and 35.7. Thus, each of the connecting arms 33.1, 33.2 supplies a force to the remainder of the closure structure which must be absorbed, in some fashion, by resilient deformation. The importance of this resilient deformation and the resiliency of the body 31 and lid 32 of the closure will be described in greater detail with reference to FIGS. 7 and 8.

Desirably according to the teachings of this aspect of the present application, the connecting elements 33.1, 33.2 should be relatively stiff, and must be sufficiently stiff such that the compression forces along the shorter edges 36.1, 36.2 do not buckle the shorter or compression edges 36.1, 36.2 due to the deformation forces 35.3, 35.4, 35.5, and 35.6. Additionally, it is highly desirable that the connecting elements 33.1, 33.2 be relatively torsionally stiff. Preferably, the cross-section of each of the connecting elements 33.1., 33.2 along arrow cc of this figure be sufficiently torsionally stiff.

The torsional stiffness of the overall closure 30 can be modified by increasing the distance B between apexes to increase the overall torsional stiffness of the closure 30. Increasing the torsional stiffness of the overall closure is accomplished as the dimension B between apexes defined by the bending regions 34.1, 34.2, 34.3, and 34.4 increases. Desirably, in order to produce an acceptable level of torsional stiffness of the overall container 30, apexes 38.1, 38.2 should be spaced apart from each other by distance B selected to preferably at least half the distance of the length of each shorter edge 36.1, 36.2. By increasing B, a stable and self-centering construction of the hinge arrangement may be obtained. However, B cannot increase without limit as this increases the distance between the apexes and must necessarily increase the angle $\omega$ and/or the angle $\phi$. In contrast, constructions with a small distance B or where the apexes 38.1, 38.2 of the triangles defined by the bending regions 34.1, 34.2, 34.3, and 34.4, when coincident, produce a hinge construction which is torsionally unstable and flimsy with unsatisfying and insufficient coordination between hinge parts, especially in the fully opened position.

Figure 7:
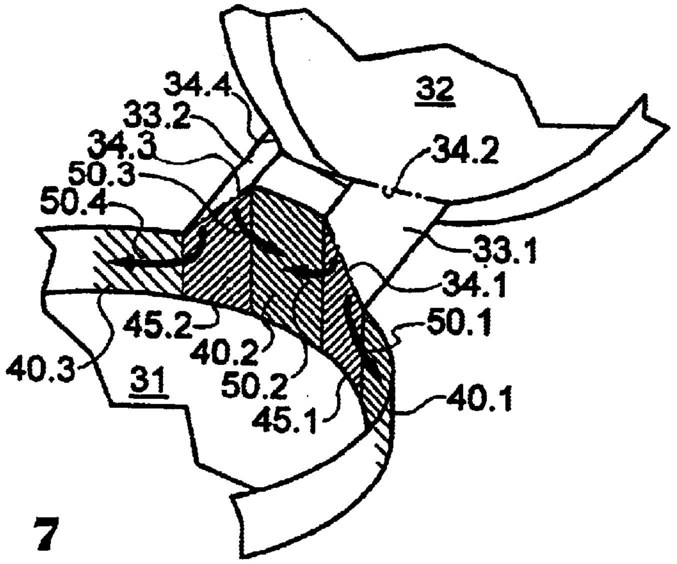
FIG. 7 is an illustration of the embodiment of FIGS. 5 and 6 of the present application showing in greater detail an arrangement of energy accumulating buffers as used in accordance with the teachings of the present application.

FIG. 7 is a further explanation of the embodiment of FIG. 6 and shows significant inventive features of the present application. The importance of these features may be best understood after an understanding of the operation of the '308 patent already discussed above. In the '308 patent, as illustrated, for example, in FIG. 6 thereof, a substantially flexurally rigid intermediate part 4.1, 4.2 of each hinge element is connected to the body and lid with upper and lower coupling elements 6.1, 6.2, 7.1, and 7.2 which correspond generally to coupling or transmitting areas or regions 45.1, 45.2 of the body 31 of the closure 30 as illustrated in FIG. 7. Of course, equivalent coupling elements to the body coupling elements 45.1, 45.2 are also provided on the cap 32 of the closure 30 in accordance with the teachings of the present application.

As explained in the '308 patent, the coupling elements are elongation relieving elements of a resilient nature. While the equivalent portions of the present application, the coupling or transmitting areas 45.1, 45.2 may be resilient, the present application transmits some or all of this force to adjacent resilient areas including resilient area or region 40.2 provided between the coupling or transmitting areas 45.1, 45.2, and the resilient areas or regions 40.1, 40.3, provided on opposed sides of the coupling or transmitting areas 45.1, 45.2.

Thus, according to the teachings of the present application as illustrated in FIG. 7, at least some induced structural deformation is supplied from the coupling or transmitting areas 45.1, 45.2 in the embodiment of the present invention to at least one resilient area 40.1–40.3. This has a secondary benefit. In the '308 patent, the coupling elements 6, 7 had to be made resilient to absorb these deformation forces. In contrast, in the present application, these coupling or transmitting areas 45.1, 45.2 need not be made resilient, although they may be so made. Instead, according to the teachings of the present application, the coupling or transmitting areas 45.1, 45.2 transmit some or all of the deformation farces to adjacent resilient areas 40.1–40.3. This allows increased flexibility in hinge design and gives the hinge designer the choice of where deformation energy is absorbed for retransmission to produce the desired snap action driving the hinge to one of its stable states.

FIG. 7 illustrates this transfer of deformation forces into one of the resilient areas 40.1–40.3. Referring once again to FIG. 6, the structural deformation forces are illustrated by arrows 35.1–35.8. These forces are transmitted from the coupling or transmitting areas 45.1, 45.2 as illustrated in FIG. 7 by arrows 50.1–50.4. In accordance with the teachings of the present application, these resilient areas 40.1–40.3, alone, or in conjunction with the coupling or transmitting areas 45.1, 45.2 function as energy accumulating buffers to temporarily store the structural deformation or distortion energy which may be later returned to the hinge to provide snap action closure or opening to one of the hinges stable states. When energy is released from the resilient areas 40.1–40.3, it is transmitted back to the hinge via the same paths indicated by arrows 50.1–50.4, but of course in the opposite way to that delivered.

According to the teachings of the present application, the energy supplied to the hinge to drive it from one stable to another is absorbed by induced structural deformation. Whereas in the '308 patent, the energy was absorbed entirely within the coupling or transmitting areas 45.1, 45.2 in the present invention, and, in accordance with the teachings of FIG. 7, some or all of this energy is transmitted to the adjoining resilient areas 40.1–40.3. Thus, if the designer designs the coupling or transmitting areas 45.1, 45.2 to be substantially rigid, substantially all deformation energy is transmitted to the adjacent resilient areas 40.1–40.3. Alternatively, within the contemplation of the present application, the designer may design the closure so that some energy is buffered in the coupling or transmitting areas 45.1, 45.2 while some area is transferred to the adjacent resilient areas.

This solution accomplishes the beneficial result of transmitting the accumulated energy over a greater area, allowing sufficient snap action force even in situations where the coupling or transmitting areas 45.1, 45.2 are relatively small. Thus, the techniques of the present application allow the inventive techniques of the applicants such as that disclosed by the prior '308 patent, to be more flexibly implemented and implemented to smaller closures.

Although the coupling and transmitting areas 45.1, 45.2 and resilient areas 40.1–40.3 may be visibly identifiable in the finished closure, this need not be the case. For design reasons, it may be desirable to completely integrate these closure parts. Particularly, in situations where deformation energy is intended to be transmitted between the coupling or transmitting areas 45.1, 45.2 to the resilient areas 40.1–40.3, all areas may have the same wall thickness.

The deformation energy stored in the energy accumulating buffers including the resilient areas 40.1–40.3 are desirably supplied with a "flat" force-deformation characteristic. This is best accomplished by relatively long spring elements, as compared to the degree of deformation imparted. Such a flat characteristic is best obtained through the energy storage accomplished through a deformation by bending. Thus, the resilient areas 40.1–40.3 are preferably built as resilient elements intended to deform by bending. It is important to understand that the required bending would not be achievable with hinge arrangements having a main hinge rotation axis, since that would cause a complex stress characteristic typically causing the problems described above.

It is apparent from the foregoing that the resilient areas 40.1–40.3 can substantially increase the amount of spring energy absorbed Tom the connecting arms 33.1, 33.2, as passed through the coupling or transmitting areas 45.1, 45.2. Thus, a substantially improved result is achieved by the use of such areas.

Figure 8:
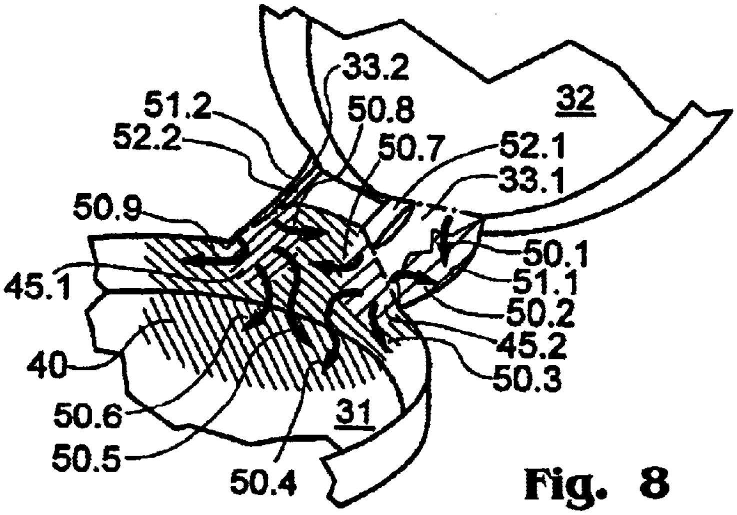
FIG. 8 illustrates an embodiment of the present application employing an alternative arrangement of energy accumulating buffers in accordance with the teachings of the present application.
Figure 13:
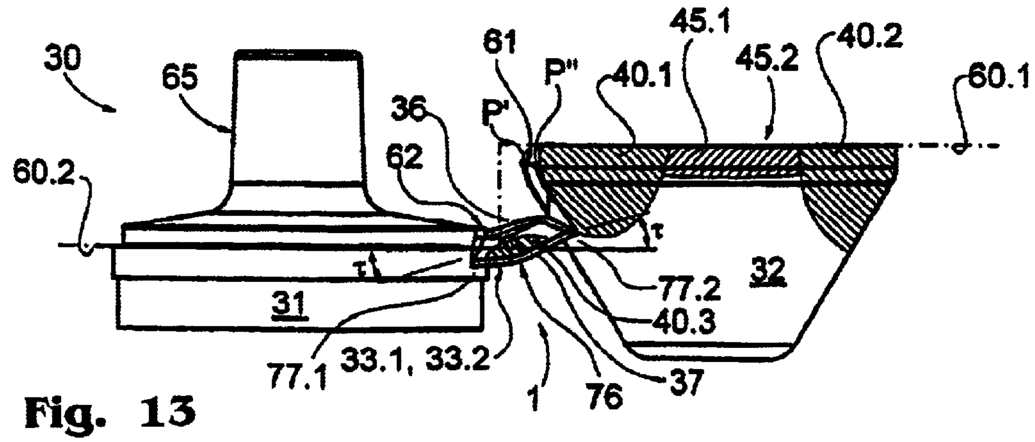
FIG. 13 is a side view of still another embodiment of a hinge produced in accordance with the teachings of the present application.

FIG. 8 shows a schematic diagram of an alternative embodiment of the invention. FIG. 8 principally differs from FIG. 7 in that the outer, longer edges 51.1, 51.2 of the connecting elements 33.1, 33.2 are spatially curved. This may be primarily for the purpose of improving the design integration in a specific closure design such as illustrated in FIG. 13. However, in this example, the curved areas along the outer edges 51.1, 51.2 of the connecting elements 33.1, 33.2 can be used as energy accumulating buffers providing additional bending deformation. In this circumstance, areas along the inner edges 52.1, 52.2 must nevertheless be built with sufficient stiffness to prevent buckling or bending as previously discussed, thereby providing the required torsional stiffness to cause each entire connecting elements 33.1, 33.2 to be torsionally stiff.

In this embodiment, some deformation force is also transmitted to the coupling or transmitting elements 45.1, 45.2 and further to the resilient areas 50.1–50.9. In this embodiment, the coupling or transmitting elements and resilient areas are less clearly defined, with respect to each other, the entire localized area of the body 31 functioning as an energy accumulating buffer. Similarly, it should be understood that all of the description of transmission of forces, with respect to FIGS. 7 and 8, although described specifically with respect to the body 31 of the closure 30, equally apply to the lid 32 of the closure 30. It should be understood that in accordance with the principals of the present application, it is not necessary to accumulate energy in both the body and lid. However, at least one resilient area must be provided in the body, lid, or connecting arm in accordance with the teachings of the present application.

The identification of resilient areas and coupling or transmitting areas is not easily ascertainable when an individual closure is viewed without technical aid. However, the identification of these areas may be done by any known technique. Perhaps the easiest way to identify such areas is through the use of Finite Element (FE) Analysis techniques available through a number of commercially available computer aided design and analysis programs.

Figure 9:
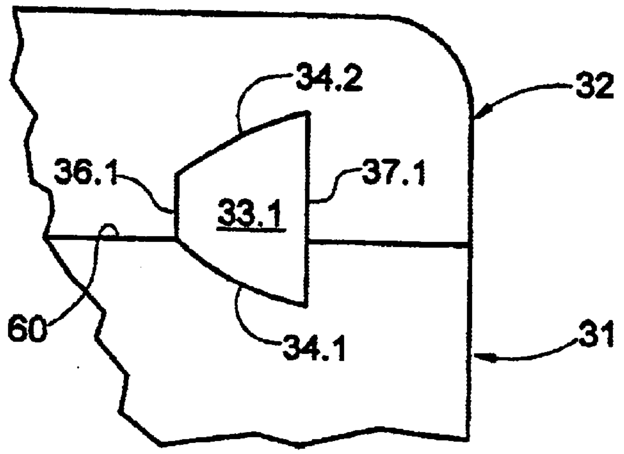
FIG. 9 illustrates an embodiment of the present application having curved bending areas.

FIG. 9 illustrates an alternative embodiment of the closure of the present invention where the bending regions 34.1, 34.2 are curved or arcuate. Again, the connecting elements, in this case 33.1, connect the closure body 31 from the closure lid 32, which elements intersect along a parting plane 60 which in this embodiment is somewhat stepped. Otherwise, the embodiment of FIG. 9 is generally similar to .the other embodiments of the present application.

Figure 10A:
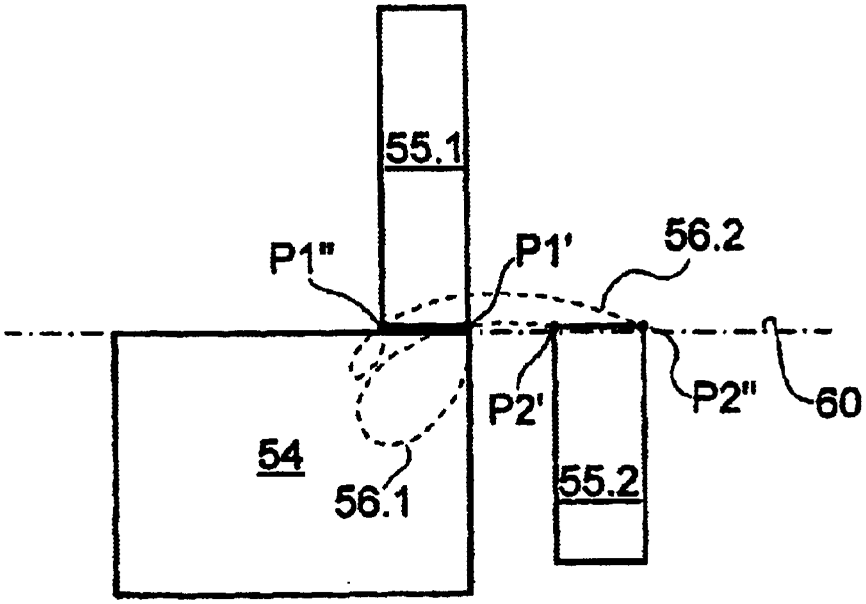
FIG. 10*a*), 10*b*) shows paths of specific points in space of a hinge which constrains the first and second hinge parts into paths which interfere (FIG. 10*a*) and which avoid interference (FIG. 10*b*)
Figure 11:
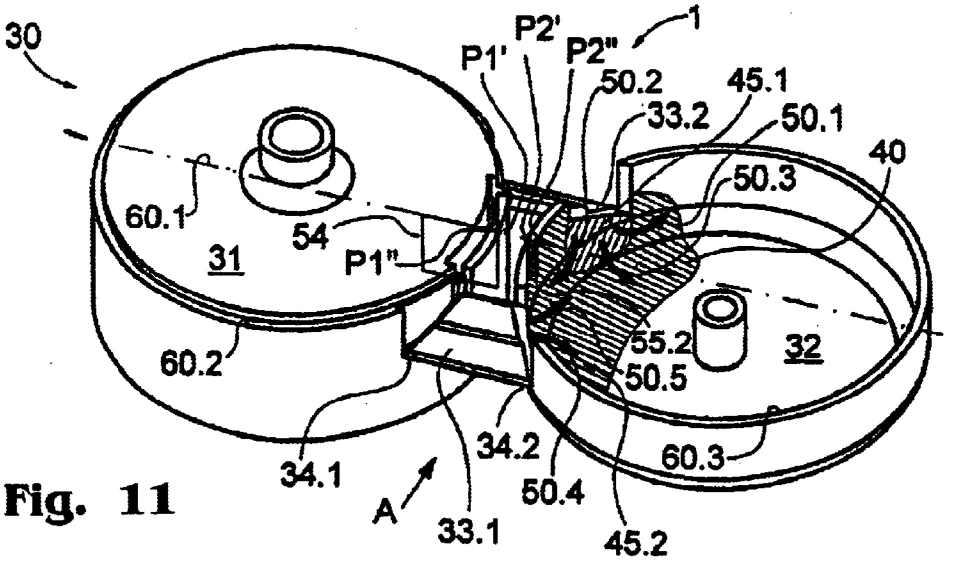
FIG. 11 and FIG. 12 are perspective views illustrating additional embodiments of the hinge of the present application employing the principles explained with reference to FIGS. 10*a*), 10*b*)

FIG. 10*a* shows the paths 56.1, 56.2 of two points P' and P" located at the back of a lid 32 of a closure 30 according to the embodiment of FIG. 11. In FIG. 11, a rectangle 54 is shown schematically on the body 31 of the closure 30. (see FIG. 11). This rectangle is also schematically illustrated in FIG. 10*a*. The direction of viewing is indicated by an arrow A of FIG. 11. The location of a parting plane of the closure 30 is illustrated as line 60 in FIG. 10*a* which is illustrated as the median parting plane line 60.1 in FIG. 11.

The rectangle 54 shows schematically the back portion 55 of the lid 32 (which extends downwardly from the lid 32 in the closed position) in the area of the points P' and P" in a closed position (55.1) and in open position (55.2). The two dotted curves 56.1 and 56.2 show the movement of the two points P' and P" in space as the closure is moved between the open and closed positions. It is obvious that the two points P' and P" of rectangle 55 collide with the rectangle 54. This means that the lid 32 of closure 30 would, in this case, collide with the body 31. This collision can be avoided in accordance with the teachings of the present application. This can be done, by moving the points P' and P" on specific, suitable pattern paths as shown in the cinematic curves of FIGS. 4*a*) to 4*c*).

Figure 10B:
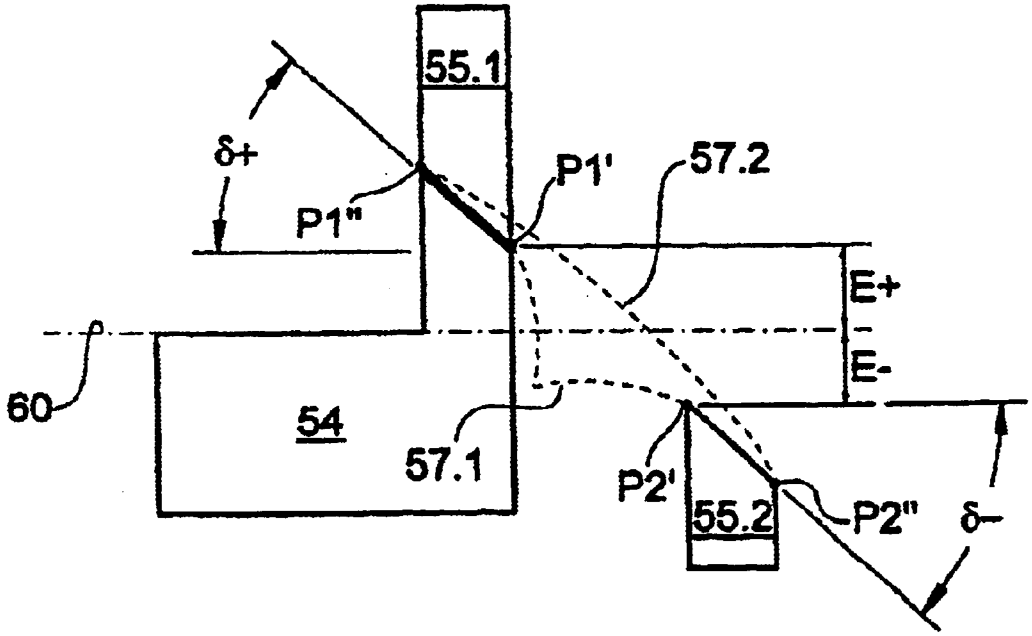
Figure 12:
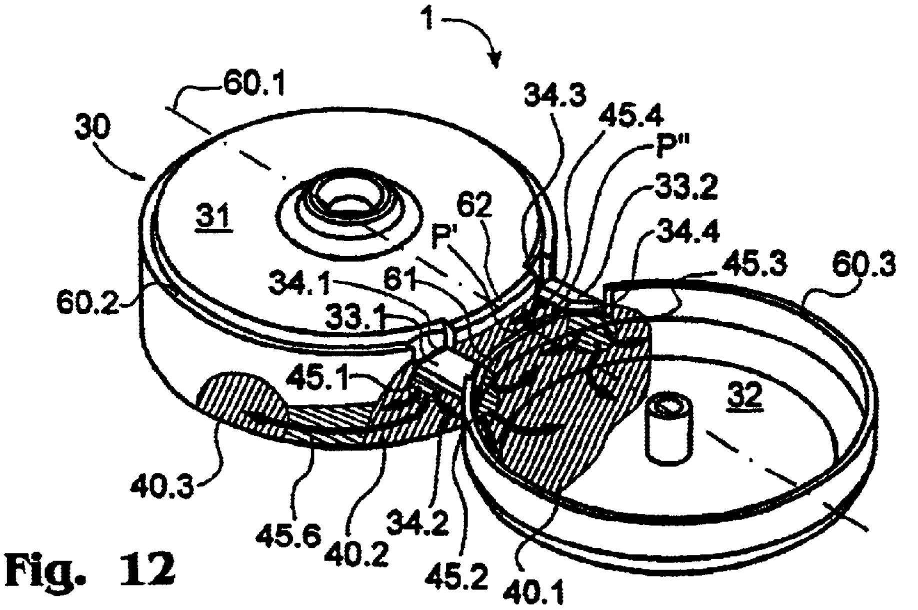

FIG. 10*b*) shows a preferred example of a solution to the problem explained above with respect to FIG. 10*a*), which prevents a collision between the body 31 and the lid 32, is shown in FIG. 10*b*). By moving the points P' and P" vertically by a distance E above the parting plane 60 and inclining them by an angle δ (see also FIG. 14), the two points P' and P" move on completely different paths 57.1, 57.2 and do not collide with the lower rectangle 54 which represents the lower body 31 of the closure 30. The points P' and P" are here positioned in a way, that they move immediately out and away from the contour of the rectangle 54 representing the lower body 31. A preferred embodiment of such a solution is shown in FIG. 12.

FIG. 11 shows a preferred embodiment of a closure 30 with a coordinated multi-axis hinge arrangement 1. The closure 30 comprises a body 31, a lid 32 and two connecting arms 33.1 and 33.2 which are connected to the body 31 and the lid 32 over bending areas 34.1 to 34.4. A parting plane 60 of the closure 30 is indicated by the numbers 60.1, 60.2 and 60.3. Points P' and P" are located in this embodiment on the parting plane 60.

The connecting arms 33.1,33.2 are here built with a thick compression area and a thin tension area. The thick compression area is sufficiently thick to avoid not buckling or bending under pressure load. This areas have, in this embodiment, no functional significance for the snap effect of the closure 30. The cross section of the connecting elements is built torsionally stiff in accordance with the teachings of the present application.

Coupling or transmitting elements 45.1, 45.2 in this environment may, depending upon the application desired, accumulate a portion of the deformation energy. The coupling or transmitting elements 45.1, 45.2 further transmit some or all of the structural deformation energy produced by the multi-axis hinge arrangement 1 to adjoining resilient areas 40, which work alone or in conjunction with other elements as the energy accumulating buffer. Thus the resilient areas may optionally operate in conjunction with the coupling or transmitting elements 45.1, 45.2. Here the energy is temporarily stored, preferably by bending deformation. Arrows 50.1–50.5 illustrate this energy transmission process.

The closure of FIG. 11 is built with a locking mechanism. The points P' and P" collide in a desirable and controlled manner with the body 31 such that the coordinated multi-axis hinge arrangement is locked or latched. The hinge can be pressed on the back of the body 31 near point P'1 to release the latch. The latching mechanism is described in detail in Swiss Patent Application No. 0981/98 filed Apr. 30, 1998, which is hereby incorporated by reference into the present application.

FIG. 12 shows another preferred embodiment of the closure 30 with a coordinated multi-axis hinge arrangement. As with other embodiments described above, the closure comprises a body 31, a lid 32, and two connecting arms 33.1, 33.2 connected to the body 31 and lid 32 by bending areas 34.1–34.4. At this point, it should be mentioned that the bending areas 34.1–34.4 may be desirably constructed in any of the embodiments of the present application as thin film hinges casting the entirety of the closure including body and lid as a single monolithic plastic construction. Thus, it is apparent that a closure according to the teachings of the present application may be efficiently constructed.

Figure 14:
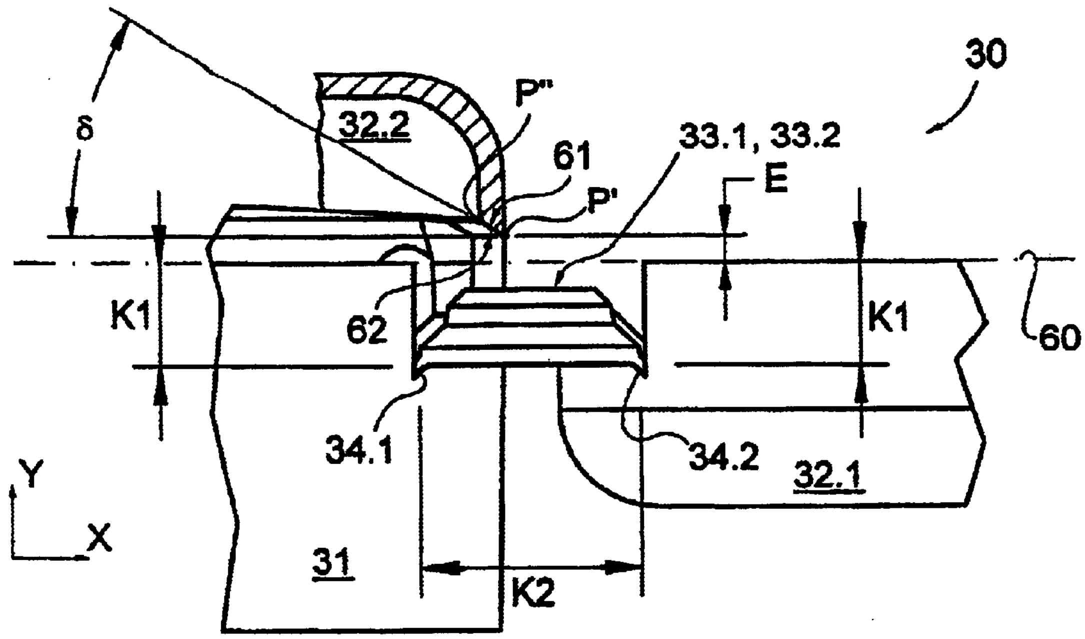
FIG. 14 is a side view of another embodiment of a multi-axis hinge arrangement of the present application illustrating manufacturing shrinkage compensation principles; and FIGS. (15*a*) and (15*b*) show a cross section through an improved film hinge produced in accordance with one aspect of the present application in the open (FIG. 15*a*) and closed (FIG. 15*b*) states.

The parting plane 60 of the closure 30 is indicated by numbers 60.1, 60.2, and 60.3 of FIG. 12. Points P' and P" are arranged in this embodiment on a surface 61, thus shown in FIG. 14, which is located a vertical distance E, as best shown in FIGS. 10*b*) and 14 from the parting plane 60. The distance E is chosen so that no collision between the lid 32 and body 31 occurs at any time. The plane 61 is desirably inclined with respect to the parting plane 60 by the angle δ as illustrated in FIGS. 10 and 14. Plane 61 corresponds, in a closed position of the closure 30, with a surface 60.2 of the body 30 such that no gap exists and optimal design is achieved.

In this embodiment, the coupling or transmitting areas 45.1–45.6 transmit structural deformation and its attendant energy storage produced by the multi-axis hinge arrangement 1 to adjoining resilient areas 40.1–40.3. Of course, the transmitting areas 40.1–40.6 may also be resiliently deformable in order to also store energy. The resilient areas 40.1–40.3 with any resilient coupling or transmitting areas 45.1–45.6 work as energy accumulating buffers where the deformation energy is temporarily stored, preferably by bending deformation. This energy is then returned to the hinges to provide snap-action closure.

The dark arrows 50.1–50.5 of FIG. 12 illustrate this transmission process as described above with respect to FIG. 11. FIG. 12 differs somewhat from the other figures in that FIG. 12 illustrates that the resilient area 40.3 need not be located immediately beside the multi-axis hinge arrangement 1, but can be located anywhere on the closure parts so long as transmission of structural deformation and its attendant energy storage is guaranteed. In accordance with the teachings of the present application, through the use of known modeling techniques, the size of resilient areas, amount of energy stored therein, the amount of force transferred from the hinges, the location of the stable positions and virtually any other aspect of the hinges performance may be controlled.

The connecting elements 33.1, 33.2 in the embodiment of FIG. 12 are relatively thick planar plates which are torsionally stiff. The connecting elements 33.1, 33.2 are relatively flat on both surfaces thereof and the outer shape thereof is shaped conformally to the exterior of the closure so that the connecting elements 33.1, 33.2 may be optimally integrated to the outer shape of the closure. Of course, the design of the cross-section of the connecting elements must consider the requirements of torsional stiffness, the tension and compression forces, and the shrinking behavior of the selected geometry. However, the principles described herein can be followed to achieve a hinge design having the desired performance characteristics.

FIG. 13 shows another preferred embodiment of the closure 30 employing the coordinated multi-axis hinge arrangement 1 of the present invention. The closure 30 in the FIG. 13 embodiment is distinguished from the other closures in several significant respects. Firstly, the parting plane 60 of the closure 30 is stepped as indicated by the closure lines 60.1, 60.2. Although this prevents the closure lid from retracting away from the closure body to the same degree as the other embodiments, this may be necessary in order to accomplish specific design configurations such as the complex shape of FIG. 13.

The multi-axis hinge arrangement 1 is arranged in this embodiment at an angle τ which serves to raise the lid parting plane 60.1 with respect to the body parting plane 60.2, when the closure is in the open position. The purpose of this angle is self-evident, in order to allow the closure lid to clear the protruding and very high spout 65 of the closure body 31.

In this embodiment, points P' and P" are arranged in a surface 61 which is located a vertical distance E from the parting plane 60 as illustrated in FIGS. 10*b*) and 14. This distance E is chosen in this embodiment so that no collision occurs between the lid and the body. The plane 61 is inclined with respect to the parting plane 60 by an angle δ as has already been discussed with reference to FIGS. 10*b*) and 14. The plane 61 corresponds, in the closed position of the closure 30, with surface 62 of the body 31, such that no gap exists and an optimal design is achieved in this embodiment.

The resilient areas 40.1–40.3 in this embodiment work as energy accumulating buffers in the manner already discussed with the other embodiments. Note that in this embodiment, however, the deformation energy may be transmitted to a portion of the cap considerably distant from the hinge area, which transmission is within the contemplation of the embodiments of the present application.

The embodiment of FIG. 13 further differs from the other embodiments in that the connecting elements 33.1, 33.2 are provided with a spatially curved "knee" shape such that their outer shape is conformally configured with the exterior design of the body 31 and its lid 32. An area along the longer knee shaped connecting element free edge 37, by virtue of the bend or knee in the connecting element 33.1–33.2 can function, in part, as an accumulating buffer, illustrated as the resilient area 40.3. Thus, in this embodiment which employs a knee in the hinge connecting element, a portion of the energy for the snap effect may be stored by bending deformation within the hinge, itself.

Of course, the shorter connecting element free edge 36 in this embodiment must be built so that it does not buckle or deform under the compression pressure it is subjected to. Further, in order to provide a good snap action hinge, the connecting elements 33.1 and 33.2 must be built with sufficient torsional stiffness.

FIG. 14 is a partial side view of the closure in the direction of arrow A in FIG. 11. FIG. 14, in addition to illustrating the lid 32 in the open position, further includes a partial sectional view of the lid in the closed position, illustrated as 32.2. Points P' and P" are here arranged in a surface 61 located at a vertical distance E (as explained with reference to FIGS. 10*b*) and 14) from the parting plane 60. Once again, the distance E is chosen to avoid any collision between the lid 32 and body 31. Also, once again, the plane 61 is inclined with respect to the parting plane 60 by the angle δ achieving optimal design in the manner already discussed.

FIG. 14 exhibits, however, another advantageous attribute. It is particularly difficult to build a precise snap-hinge, primarily due to the many geometrical restrictions of the construction and the problem of material shrinkage. The coordinated multi-axis hinge arrangement of the present application provides a technique for compensation of shrinkage and other problems due to geometry. With respect to an x-y coordinate system as illustrated in the figure, material shrinkage in the mold is normally bigger in the direction of y as compared to x, as explained with reference to the directional arrows of FIG. 14. By casting the closure in the open state and by compensating for shrinkage by adjusting the links of the hinges, shrinkage may be properly compensated for. This can be accomplished by adjusting the dimensions K1 and K2 in FIG. 14.

Figure 15A:
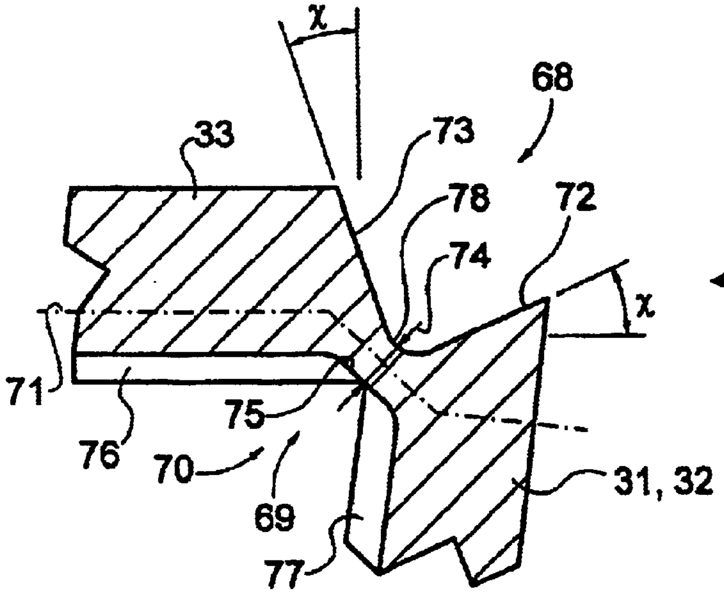
Figure 15B:
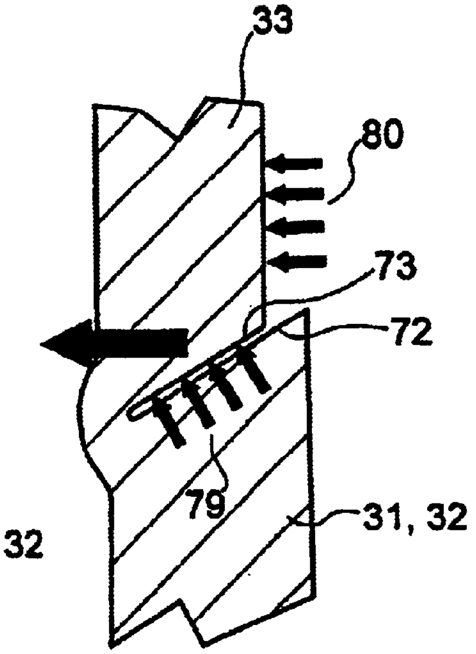

FIG. 15 illustrates a preferred design, in cross-section, of the film hinge 70 employed as the bending areas 34.1–34.4 in one preferred embodiment of the present application. FIG. 15*a*) illustrates the film hinge 70 when the closure is in an open position, while FIG. 15*b*) illustrates the hinge when in a closed position. Adjoining the film hinge 70 is a connecting element 33 and a body 31 or lid 32. As is apparent from the embodiments discussed early in this application, the body 31, lid 32, and connecting elements 33 are often curved in order to accomplish desired design characteristics. The film hinge 70 should be designed with this consideration in mind. The film hinge should be designed for precise fitment into available space and should be designed by parts of a mold which may be easily separated when the mold is open. Therefore, it is important that the design of the film hinge be insensitive to geometric imperfections.

The film hinge illustrated in FIGS. 15*a*), 15*b*) includes an inner part defined by two planes 72, 73 which are inclined by an angle χ with respect to vertical to obtain the best flow patterns of material and for optimized load transmission. The angle χ should be in a range such that the thinnest possible thickness 74 of the film hinge 70 is still clearly defined.

The planes 72, 73 are connected by a cylindrically shaped surface 78 which defines the inner edge of the film hinge 70. The outside of the film hinge is formed by a plane 75 which runs from a first outer surface 76 which, in this example, is curved to a second outer surface which is also curved. Note that the first outer surface 76 is the outer surface of the connecting element 33 while the second outer surface 77 is the outer surface of the body 31 or lid 32. As can be seen from FIG. 15*a*), the width of the plane 75 approaches zero at the relative center of the film hinge 70 due to the arcuate curvature of the surfaces 76, 77. However, this plane has a significant width at the edge of the film hinge 70, also due to this curvature. Of course, all of the film hinges should be polished or very smooth.

FIG. 15*b*) illustrates a further advantage of this film hinge. In the closed position, the plane 72 is generally aligned with the plane 73, and aids in the positioning of the connecting element 33. Further, this function is to generally strengthen the film hinge when in the closed position. This is especially useful in the area of the short or inside free edge of the connecting element 33. This is indicated by arrow 79. Of course, additional elements on the body 31 and lid 32 of the closure 30 may be used to aid in positioning the connecting element 33. This is indicated, for example, by arrows 80. As is further self-evident, the surfaces 72, 73 need not be planar and other shaped surfaces may be utilized although such surfaces should be preferably conformal in the closed position.

A further advantage of the film hinge 70 of FIG. 15 is that the film hinge can also work as an energy accumulating buffer by an appropriate design. For example, the alternative embodiment of FIG. 9 accumulates energy in the hinge through the curvature of the hinge. Of course, other non-linear hinge designs can accomplish the same purpose.

From the above-described embodiments of the present invention, it is apparent that the present invention may be modified as would occur to one of ordinary skill in the art without departing from the scope of the present invention and should be defined solely by the appended claims. Changes and modifications of this system contemplated by the present preferred embodiments will be apparent to one of ordinary skill in the art. Thus, it is apparent that the invention may be varied in many ways without departing from its spirit and scope, and all such modifications would be obvious to one of ordinary skill in the art. Accordingly, the proper scope of the present invention should be defined solely by the appended claims.

What is claimed is:

1. A multi-axis hinge arrangement comprising a first hinge part;

a second hinge part;

at least two connecting arms spaced a distance apart, each said connecting arm being substantially torsionally stiff; and bending regions connecting each of said connecting arms to each of said first hinge part and said second hinge part;

at least one of said first hinge part and said second hinge part including, a resilient area operating as an energy storage region located remotely from said bending regions, for storing energy imparted by said connecting arms when said hinge is actuated, and transmitting regions intermediate at least one said bending region and said resilient area, and immediately contacting said bending region, said transmitting regions transmitting force supplied by said bending region by actuation of said hinge to said resilient area.

2. The multi-axis hinge arrangement of claim 1 wherein said hinge arrangement has an open hinge stable position and a closed hinge stable position, said connecting arms supplying distortion forces to said bending regions at intermediate positions between said open hinge stable position and said closed hinge stable position.

3. The multi-axis hinge arrangement of claim 1 wherein said resilient area stores energy through resilient deformation thereof.

4. The multi-axis hinge arrangement of claim 1 wherein said resilient area is provided on at least one of said first and second hinge parts between two bending regions of two of said connecting arms.

5. The multi-axis hinge arrangement of claim 4, wherein the transmitting area adjacent to the bending regions is, compared to the resilient area, substantially stiff with regard to bending and torsion.

6. The multi-axis hinge arrangement of claim 1 wherein each of said connecting arms is defined by said bending regions and by a shorter edge and a longer edge.

7. The multi-axis hinge arrangement of claim 6, wherein said longer edge of at least one of said connecting arms has a contoured form that is substantially identical in the open and closed position of said hinge arrangement, and said longer edge compared to these two positions has a reduced curvature or bending in an intermediate position of said hinge arrangement, the connecting arm being torsionally stiff at its shorter edge.

8. The multi-axis hinge arrangement of claim 1 wherein said resilient area is positioned on at least one of said first and second hinge parts with a said transmitting region interposed between said resilient area and any of said bending regions.

9. The multi-axis hinge arrangement of claim 1, where said connecting arms in the closed position transmit resilient force to enhance the snap action of the hinge upon opening.

10. The multi-axis hinge arrangement of claim 1, wherein the connecting arms have a substantially constant thickness and have an outer surface that is substantially conformal with the outer surface of the hinge arrangement.

11. The multi-axis hinge arrangement of claim 1, further comprised of the connecting arms each having a shorter edge with a greater thickness and a longer edge with a lesser thickness, the connecting arms having an outer surface that is substantially conformal with the outer surface of the hinge arrangement.

12. The multi-axis hinge arrangement of claim 1, wherein the bending regions connecting said connecting arms to said first and second hinge parts lie along hinge lines, the hinge lines associated with the bending regions of a said connecting arm intersecting at an apex, the distance B between the apexes defined by the hinge lines of said connecting arms being at least substantially half the length of the shorter edges thereof.

13. The multi-axis hinge arrangement of claim 1, wherein at least a part of a second hinge part cooperates with a part of said first hinge part during movement between open and closed positions.

14. The multi-axis hinge arrangement of claim 1, wherein a cooperating part interacting with said second hinge part and with said first hinge part comprises a protruding hinge area which engages an area of the first hinge part adjacent the connecting arms at a point where a cinematic curve of a lower edge of said first hinge part performs an initial movement outside of a surface of said first hinge part.

15. The multi-axis hinge arrangement of claim 1, wherein the bending regions are embodied as film hinges having a cross-section that is delimited by a circular curve on the inner side of the film hinges and a straight line on the outer side of the film hinges.

16. The multi-axis hinge arrangement of claim 15, wherein a supporting edge is provided at the inner side of the film hinges to constrain torsional movement of the film hinges, when in the closed position, thereby increasing the transfer of energy to said resilient area.

17. The multi-axis hinge arrangement of claim 16, wherein the supporting edge is formed by an asymmetrical arrangement of the curve delimiting the cross-section of said film hinge, thereby forming an edge that is oblique with regard to a parting plane and facing upward toward the inside of the hinge arrangement.

18. The multi-axis hinge arrangement of claim 1, wherein at least one bending region is curved.

19. A resilient hinge arrangement, comprising:

a first hinge part;

a second hinge part assuming at least two stable pivoting positions with respect to said first hinge part;

said second hinge part being arranged to pivotably move between said at least two stable pivoting positions in an elastically resilient manner;

first and second flexible connecting arms spaced a distance apart and being substantially flexurally rigid; and bending regions connecting said substantially flexurally rigid connecting arms to said first and second hinge parts;

at least one of said first and second hinge parts including, first and second coupling areas connected movably to said connecting arms through said bending regions, and one or more resilient areas connected to the first and second flexible coupling elements but spaced away from said bending regions to absorb resilient energy or flex therefrom and increase the force driving the first and second hinge parts to one of said at least two stable positions.

20. The hinge arrangement of claim 19 wherein said first hinge part is a body of a closure and the second hinge part is a lid covering an opening provided in said body.

21. The hinge arrangement of claim 20 wherein said first hinge part is fixed onto a container.

22. The hinge arrangement of claim 19 wherein each connecting arm has a short free side and a long free side;

the bending regions of said hinge arrangement being aligned along bending lines, the bending lines of each said connecting arm intersecting at an apex, the apexes of two said connecting arms being separated by a distance D greater than twice the length of the short free side of each said connecting arm.

23. The hinge arrangement of claim 19, wherein each of said connecting arms is substantially stress-free in an opened position and a closed position of said hinge arrangement.

24. A multi-axis hinge arrangement comprising a first hinge part;

a second hinge part;

at least two connecting arms spaced a distance apart, each said connecting arm being substantially torsionally stiff, and bending regions connecting each of said connecting arms to each of said first hinge part and said second hinge part;

the geometrical relationship between said first and second hinge parts and said connecting arms providing at least two stable hinge positions that are substantially strain free, said hinge arrangement when disposed other than in said stable hinge positions, developing forces at said bending regions which are resiliently absorbed by resilient areas in said connecting arms.

25. The multi-axis hinge arrangement of claim 24 wherein each of said connecting arms is defined by said bending regions and by a shorter edge and a longer edge.

26. The multi-axis hinge arrangement of claim 24 wherein said at least two stable positions correspond to the open state and the closed state of said multi-axis hinge arrangement.

27. The multi-axis hinge arrangement of claim 26 wherein one said stable position is outside the design range of motion of said hinge past the closed position thereof and hinge can not practically be moved there, the closed position of said hinge arrangement being thereby biased with a closing force.

28. The multi-axis hinge arrangement of claim 26 wherein one said stable position is spaced away from a closed position in the design range of motion of said hinge between the closed position and an open position thereof and therefor strain is imparted upon movement past this position, the closed position of said hinge arrangement being thereby biased with a snap return on opening.

29. A method of imparting a snap action to a multi-axis hinge arrangement including a first hinge part and a second hinge part separated by at least two connecting arms spaced a distance apart, each said connecting arm being substantially torsionally stiff, and being connected to said first hinge part and said second hinge part by bending regions, comprising the steps of:

providing a resilient energy storage region remotely located from said connecting arms as part of at least one of said first and second hinge parts for storing energy imparted by said bending regions when said hinge is actuated; and transmitting force from said bending regions to said resilient energy storage region over transmitting regions located immediately adjacent to said bending regions.

* * * * *